United States Patent Office 2,858,339
Patented Oct. 28, 1958

2,858,339

1-N-BUTYL BORACYCLOPENTANE AND PROCESS FOR ITS PREPARATION

Sheldon L. Clark, Kenmore, and James R. Jones, Grand Island, N. Y., assignors, by mesne assignments, to Olin Mathieson Chemical Corporation, a corporation of Virginia No Drawing. Application June 21, 1956
Serial No. 592,993

2 Claims. (Cl. 260—606.5)

This invention relates to a new composition of matter, 1-n-butylboracyclopentane, and methods for its preparation.

The new composition of this invention has the general formula:

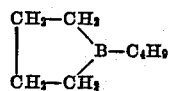

and has a boiling point of 79–79.5° C. at 75 mm. Hg. 1-n-butylboracyclopentane is useful as a chemical intermediate, as a welding fuel according to U. S. Patent 2,582,268, and also as a high energy fuel for jet engines as described in copending application Serial No. 533,944, filed September 13, 1955, of E. A. Weilmuenster and J. A. Zaslowsky. It can also be admixed with conventional jet fuels such as JP–4 in proportions of, for example, 10–20 percent by volume in order to increase their heats of combustion.

The 1-n-butylboracylopentane of this invention is prepared by reacting a di-Grignard of 1,4-dibromobutane with di-n-butylchloroborane in ether solution and distilling 1-n-butylboracyclopentane from the reaction mixture. The reaction is preferably carried out at low temperatures of the order of 0° C.

The di-n-butylchloroborane reactant can be prepared according to the method described by J. E. Smith, and C. A. Kraus, in J. Am. Chem. Soc., vol. 73, at page 2751 (1951). According to this method, tri-n-butylborane is first prepared by treating boron trichloride with n-butylmagnesium bromide. A practically quantitative yield of di-n-butylchloroborane can be obtained by then passing anhydrous hydrogen chloride through the tri-n-butylborane heated to 110° C.

The method of preparation of the new compounds is more fully illustrated in the following examples.

*Example I*

The di-Grignard of 1,4-bromobutane was prepared in 80 percent yield from 48.0 grams (2.0 g.-atoms) of magnesium and 216.0 grams (1.0 mole) of 1,4-dibromobutane in the usual manner. The Grignard solution was added dropwise, with stirring to 361.0 grams (2.2 moles) of cold di-n-butylchloroborane dissolved in an equal volume of ether. The mixture was stirred for one hour at 0° C. and then filtered through glass wool. Distillation, after ether removal, gave 67.0 grams of 1-n-butylboracyclopentane which had a boiling point of 79–79.5° C. at 75 mm. Hg. In addition 119.7 grams of tri-n-butylborane was isolated.

The 1-n-butylboracyclopentane was analyzed and found to have a molecular weight of 121 and a boron content of 8.80 weight percent. This analysis compares favorably with a molecular weight of 124 and a boron content of 8.73% calculated for a compound of the empirical formula $C_8H_{17}B$.

*Example II*

The experiment of Example I was repeated except that the di-n-butylchloroborane was added to the di-Grignard solution. The di-Grignard was prepared from 12.0 grams (0.5 g.-atom) of magnesium and 54.0 grams (0.25 mole) of 1,4-dibromobutane. 80.0 grams (0.50 mole) of di-n-butylchloroborane were employed. From the reaction mixture were isolated 21.5 grams of 1-n-butylboracyclopentane and 34.8 grams of tri-n-butylborane.

We claim:

1. As a new composition, 1-n-butylboracyclopentane of the general formula

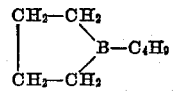

2. A method for the preparation of 1-n-butylboracyclopentane from di-n-butylchloroborane which comprises reacting a di-Grignard of 1,4-dibromobutane with di-n-butylchloroborane in ether solution and distilling 1-n-butylboracyclopentane from the reaction mixture.

References Cited in the file of this patent
UNITED STATES PATENTS

| | | |
|---|---|---|
| 2,160,915 | Schreiber | June 6, 1939 |
| 2,257,194 | Rosen | Sept. 30, 1941 |
| 2,446,008 | Hurd | July 27, 1948 |